United States Patent [19]
Kimball

[11] 4,092,869
[45] June 6, 1978

[54] SLIP PLATE ASSEMBLY FOR VIBRATION TESTING THROUGH TEMPERATURE EXTREME THERMAL CYCLING

[75] Inventor: David V. Kimball, Claremont, Calif.

[73] Assignee: Kimball Industries, Inc., Monrovia, Calif.

[21] Appl. No.: 795,183

[22] Filed: May 9, 1977

[51] Int. Cl.² ............................................ G01N 29/00
[52] U.S. Cl. ........................................ 73/665; 73/15.6
[58] Field of Search ................ 73/71.6, 91, 15.6, 665, 73/668, 663, 664, 666, 667

[56] References Cited
U.S. PATENT DOCUMENTS 3,142,172   7/1964   Taccogna ............................... 73/71.6
3,241,358   3/1966   Booth et al. ........................... 73/71.6

Primary Examiner—Jerry W. Myracle
Attorney, Agent, or Firm—Louis J. Bachand

[57] ABSTRACT

A slip plate assembly is provided for shaker-head generated vibration testing of a test piece being exposed to thermal cycling between preselected test temperature extremes in a closed environment. The assembly comprises a pair of opposed plate elements, a first plate element being beyond the closed environment and a second plate element exposed to test temperatures within the closed environment. Pin means is provided defining a singular locus of vibration transmitting connection between the first plate and the second plate in dimensionally temperature-responsive relation.

15 Claims, 7 Drawing Figures

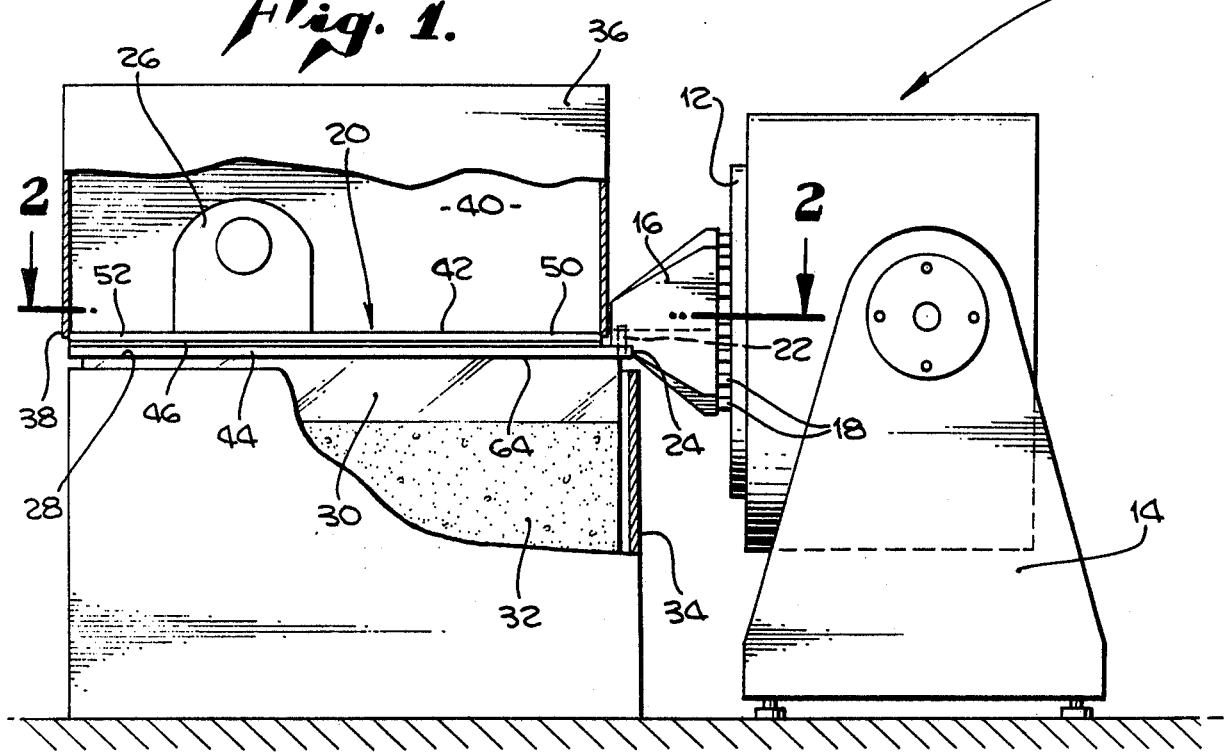
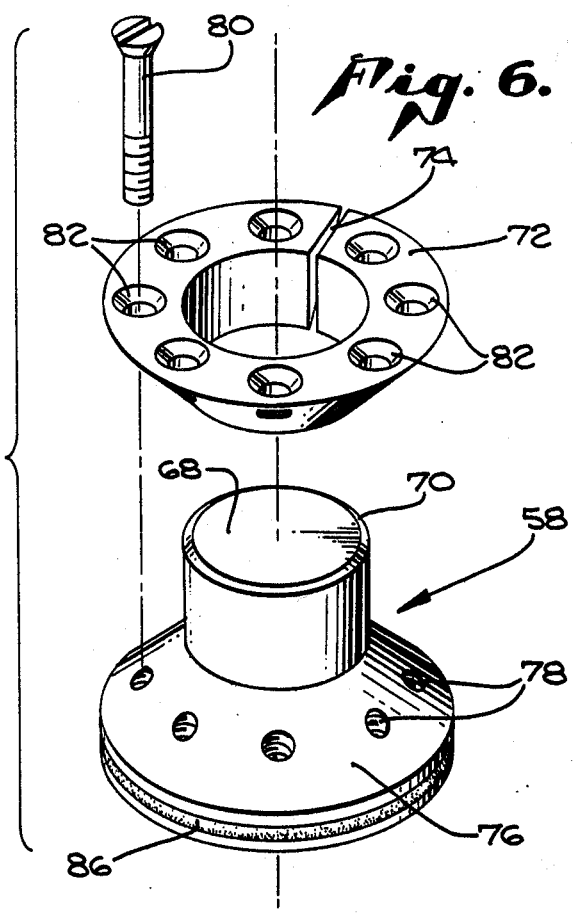

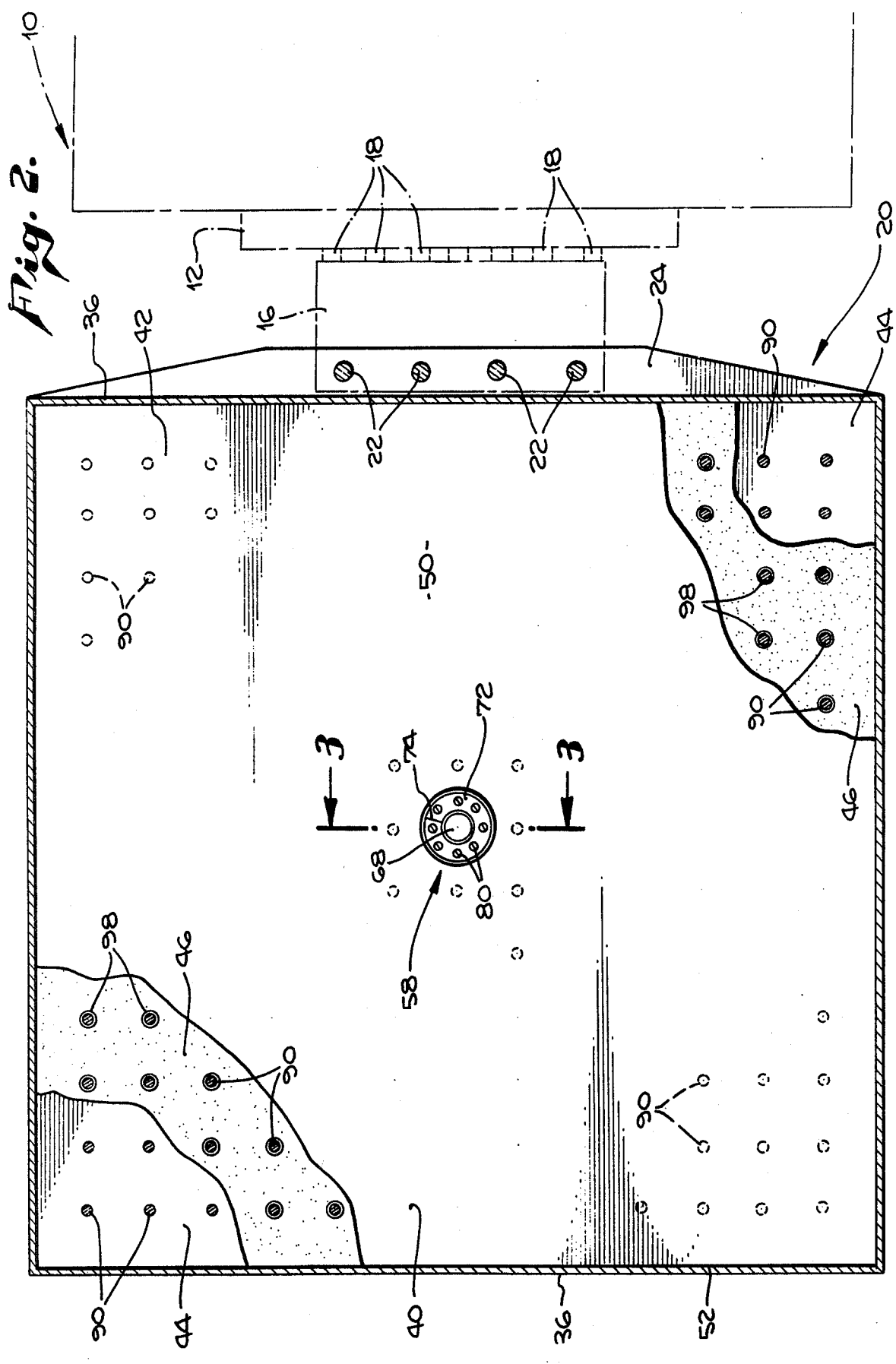

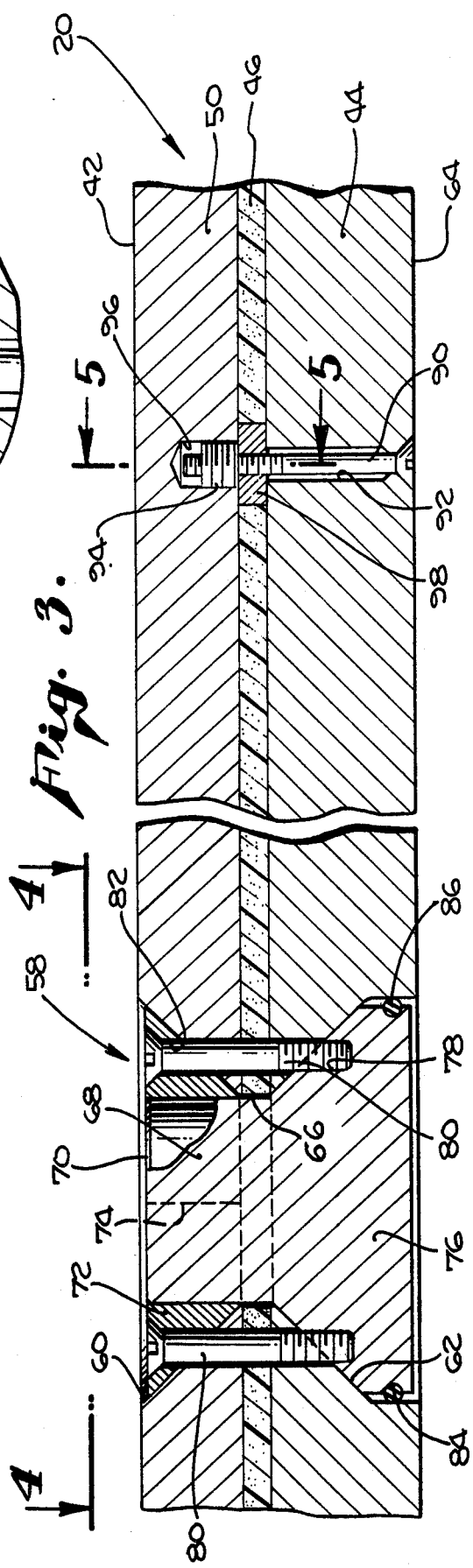
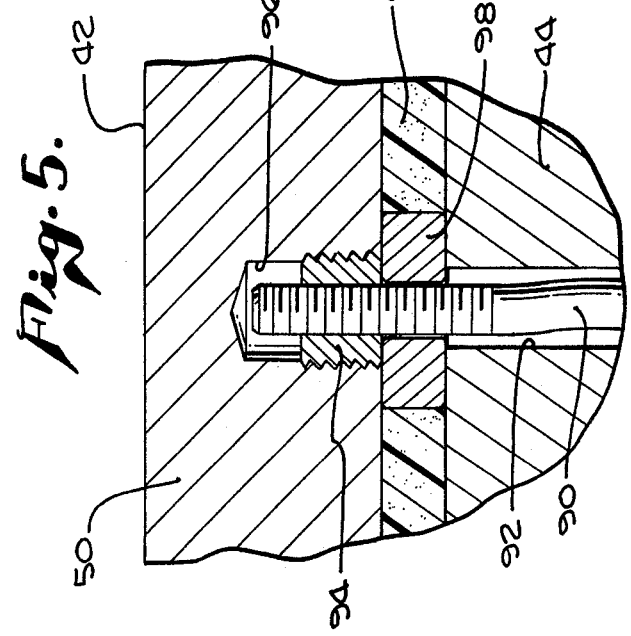
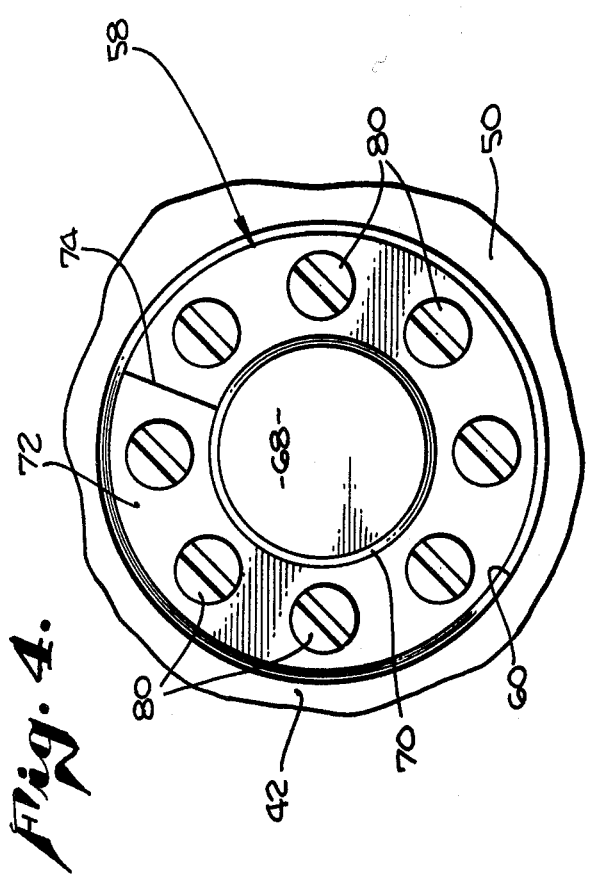

SLIP PLATE ASSEMBLY FOR VIBRATION TESTING THROUGH TEMPERATURE EXTREME THERMAL CYCLING

BACKGROUND OF THE INVENTION

This invention has to do with vibration testing of test pieces in temperature-controlled environments. More particularly, the invention has to do with improvements in slip plate assemblies for use in vibration testing of test pieces in extreme temperature thermal cycling closed environments.

Vibration testing is a now accepted procedure for evaluating the mechanical dependability of numerous pieces of equipment, especially those intended for military and space use. Devices of a mechanical, electromechanical and electronic nature are subjected to a controlled shaking in carefully prescribed tests to evaluate their use life and their use dependability. Typically, these evaluations have been carried out at room temperature or other similar ambient temperature, e.g. 72° F. It is nonetheless true that many of the devices being tested are subjected to vibration, e.g. in carriage aboard an aircraft at dramatically different temperature extremes. Thus, a fighter airplane may sit on the desert floor for substantial periods of time exposed to a searing heat, only to be followed by a scramble exercise which carries the aircraft to extremely high altitudes in a very brief period of time. The high altitude temperatures, of course, are far below 0° F. Equipment aboard the aircraft, for example gun control equipment, is thus subjected to a thermal cycling between searing desert heat and sub-freezing high altitude temperatures, all in a short space of time and all to the accompaniment of a relentless vibration.

Accordingly, there is a need to assess the dependability characteristics of equipment, not only as to its vibration-resistance capabilities at ambient temperatures, but also during thermal cycling which simulates the actual use environment. For this purpose, there have been developed controlled temperature closed environments for shrouding the test piece during vibration testing. Such shrouds are essentially chambers which totally enclose the test piece in a manner providing the desired temperature condition, or series of temperature conditions in the case of thermal cycling, established for effective testing of the device.

PRIOR ART

To comprehend the difficulty of adapting known vibration testing equipment to variable use temperature testing, it is necessary to be aware of the construction of such equipment. In general, vibration testing equipment can be considered to comprise a large electromagnet which drives at a predetermined rate a shaker head. The shaker head, in turn, is coupled to a driver bar which adapts the shaker head configuration to the slip plate which actually carries the test piece during testing. The driver bar is coupled by driver pins to the slip plate, which is formed of lightweight and highly rigid metal, and which rests upon a highly slippery surface, such as an oil film on a marble slab, which in turn rests upon a support block. The test piece is secured to the slip plate, the weight of the test piece being borne by the oil film, marble slab and ultimately the support block. Accordingly, the slip plate is free to move, e.g. in a horizontal plane in accordance with the vibration of the shaker head.

At ambient temperature testing conditions, the expansion and contraction of the slip plate is of no great concern, since temperature variations are small. When extreme temperature cycling is added to the test regimen, however, expansion and contraction of the metal becomes a factor to be reckoned with. The criticality of efficient vibration transmission between the shaker head and the test piece so that a known vibration is imparted to the test piece in accordance with the testing regimen will be readily appreciated. Heretofore, this efficiency in vibration transmission has been ensured by utilizing a single unitary mass of lightweight metal such as magnesium as the slip plate. It has been noted, however, that during thermal cycling, e.g. between −50° F and 200° F that a 48 inch square slip plate may experience an expansion of 0.150 inch, which plays havoc with maintaining the desired rigid coupling between the shaker head and the slip plate.

SUMMARY OF THE INVENTION

Accordingly, it is a major objective of the present invention to provide a slip plate which is adaptable to use in controlled temperature environments, including those having thermal cycling between temperature extremes. It is a further objective of the invention to provide a slip plate assembly which functions effectively with highly efficient vibration transmission through all sectors of a thermal cycling regime. It is a further objective to provide a slip plate assembly of simple construction which functions regardless of surrounding temperature conditions. It is a still further objective to provide an improved vibration testing apparatus which effectively tests test pieces through thermal cycling between temperature extremes. It is still another objective of the present invention to provide an improved connection between components of the slip plate assembly, enabling maintenance of efficient vibration transmission through thermal cycling between temperature extremes. It is yet another objective of the invention to provide a novel form of slip plate assembly component connector pin which is temperature-responsive in vibration-transmitting relation to maintain rigid, effective coupling of slip plate components during vibration testing through thermal cycling between temperature extremes. It is a still further objective of the invention to provide such a connector means which is self-compensating in accordance with slip plate component expansion and contraction to maintain the rigid interconnection necessary for efficient vibration transmission. It is a still further and more specific objective of the present invention to provide a slip plate assembly wherein a portion of the assembly is exposed to a closed environment which is being temperature cycled during vibration testing and another portion of which is beyond such closed environment, the two portions being coupled by a novel pin means in vibration-transmitting relation. It is a still further objective of the present invention to provide for central coupling of slip plate assembly components to minimize the effects of disparate expansion and contraction of the components while maintaining efficient vibration transmission. The foregoing and other objectives of the invention are realized in accordance herewith in a slip plate assembly for shaker head vibration testing of a test piece being exposed to thermal cycling between preselected test temperature extremes in a closed environment wherein the assembly comprises: spaced, generally parallel and congruent plate elements including a first plate element beyond the closed environment for coupling of the assembly to the shaker head, and a test piece-carrying, test temperature dimensionally-responsive second plate element exposed in said closed environment; and pin means defining a singular locus of vibration-transmitting connection of the first plate element to the second plate element in dimensionally temperature-responsive relation. Specific features of the slip plate elements are that each is generally rectangular, the first plate element further including a skirt portion for coupling thereof to a shaker head-carrying driver bar, both plate elements typically comprising lightweight metal and each being coaxially centrally apertured to receive the pin means.

The pin means typically comprises a vibration-transmitting post and first and second post collars adapted to respectively engage the outer surfaces of the first and second plate elements in plate element connection-effecting relation. Further included are plural fasteners in circularly distributed relation about the post urging the first and second collars uniformly toward each other and into engagement respectively with the first and second plate elements therebetween.

In preferred embodiments, the first plate element has a post-receiving central aperture therein at the locus of vibration-transmitting connection, the aperture being tapered, and the first collar being congruently tapered to closely interfit with the aperture in its engaged relation with the first plate element. Also, the second plate element has a tapered post-receiving central aperture therein coaxial with the first plate central aperture, that aperture also being tapered toward said first plate element, the second collar being congruently tapered to closely interfit with the second plate aperture and radially split to bind on the post responsive to progressive interfitment of the second collar into the tapered second plate aperture, thereby maintaining vibration transmission through temperature-induced dimensional variations in the second collar and second plate element.

A thermal insulation means may be provided, thermally insulating the first plate element from the second plate element exposure to test temperature extremes, such thermal insulating means may typically comprise a normally solid non-metallic material less heat conductive than either plate element, or the air. Where the thermal insulating means is a non-metallic solid, it may comprise a synthetic organic polymer, e.g. a thermoplastic material foam. Further provided are means blocking relative separating movement of the first and second plate elements beyond the noted post and collar arrangement, such separation blocking means comprising typically plural areally distributed fasteners selectively blocking relative separating movement of the plate elements in second plate element thermal expansion and contraction-accommodating relation.

In a highly preferred form of the invention, there is provided a slip plate assembly for shaker head generated testing of a test piece being exposed to thermal cycling between preselected test temperature extremes in a closed environment, the assembly comprising: spaced, lightweight metal plate elements, including a first, generally rectangular plate element having a skirt portion on one side for coupling to a shaker head-carried driver bar and an axis-centered aperture formed therein tapering inward from the outer surface of the first plate element, and a second plate element rectangularly congruent with the non-skirt portion of the first plate element and having an axis-centered aperture formed therein tapering inward from the outer surface of the second plate element and coaxial with the first plate element aperture, the second plate element defining means for carrying the test piece in the closed environment for testing; a thermally insulative plastic foam sheet between the first and second plate elements maintaining the elements in spaced parallel planes; vibration-transmitting pin means including a cylindrical post close fitting within the respective plate element apertures and wedge-shaped first and second post collars coaxial with the post and circularly engaged with the respective tapered portions of the apertures of the first and second plate elements; and collar fastening bolts paralleling to the post, said bolts acting to secure the plate elements with the thermal insulation sheet therebetween together in vibration-transmitting relation between the plate elements; the second plate element having dimensional response to test temperature conditions within the closed environment, the second post collar being radially split for circular expansion and contraction relatively to the second plate element expansion and contraction to maintain continuous vibration-transmitting contact between the second post collar, the post and the second plate element throughout thermal cycling; and peripheral fasteners limiting any relative movement of the first and second plate elements to movement in parallel planes.

BRIEF DESCRIPTION OF THE DRAWINGS

The invention will be further described as to an illustrative embodiment thereof in conjunction with the attached drawings, in which:

FIG. 1 is a side elevation view of a vibration testing apparatus partly broken away to show underlying parts;

FIG. 2 is a horizontal plan view thereof taken on line 2—2 in FIG. 1;

FIG. 3 is a fragmentary view of the slip plate assembly and pin connector therein taken on line 3—3 in FIG. 2 and greatly enlarged;

FIG. 4 is a plan view taken on line 4—4 in FIG. 3;

FIG. 5 is a fragmentary view taken in vertical section on line 5—5 in FIG. 3 and greatly enlarged;

FIG. 6 is an exploded view of the connector pin means according to the invention; and FIG. 7 is an exploded view of the slip plate assembly fastener bolts according to the invention.

DESCRIPTION OF THE PREFERRED EMBODIMENTS

With reference now to the drawings in detail, a vibration test apparatus is shown in FIG. 1 to comprise a large electromagnetic shaker 10 having a shaker head 12 and carried on a trunnion 14. A driver bar 16 is carried on the shaker head 12 secured by bolts 18.

A slip plate assembly generally indicated at 20 and to be described in greater detail hereinafter is coupled to the driver bar by driver pins 22 (cf. FIG. 2) at slip plate skirt portion 24. Slip plate 20 carries test piece 26 bolted on by means not shown, and rests upon an oil film 28 maintained (by means not shown) on marble slab 30, the marble slab in turn resting on a concrete block 32 encased in sheet metal housing 34.

Thus far described other than as to the details of the slip plate assembly to be described, the apparatus is conventional. A particular feature which needs to be noted before proceeding further with the description is the shroud 36 which is secured along its perimeter 38 to the slip plate so to define a closed environment at 40 bounded by the upper surface 42 of the slip plate at the bottom and the shroud on the top and sides, the test piece being located thus entirely within the closed environment 40. Means not shown provide heating and cooling facilities to the environment 40 and cyclically as desired.

Proceeding on to the novel aspects of the apparatus, and with particular reference to FIGS. 1, 2 and 3, the slip plate 20 is composed of a sandwich of a first, or lower slip plate element 44, defining to one side the slip plate skirt portion 24, and resting directly on the oil film 28; a thermal barrier or insulating foamed plastic sheet 46 congruent with the generally rectangular shape of plate element 44; and a second, or lower, plate element 50, also first plate element congruent and defining slip plate upper surface 42, the shroud 36 being perimetrically secured to the periphery 52 of this second plate element.

It will be observed that the slip plate 20 thus comprises an upper plate element 50 exposed to closed environment 40, a lower plate element 44 beyond that closed environment and a thermal barrier, insulation layer 46, which spaces the plate elements in parallel relation, and which through its construction of foamed thermoplastic or other normally solid material of lower heat transmitting properties than the slip plate elements (which are normally lightweight metal such as magnesium) prevents the conduction of heat or cold between the two plate elements. Also, only the lower plate element 44 is coupled to the driver bar and thus the shaker head. This leaves the upper plate 50 free to dimensionally respond to thermal conditions within the closed environment 40. However, the shaker head operation directly drives only the lower plate element 44.

To vibrate the test piece 26 bolted to upper plate 50, it is necessary to rigidly mechanically couple the upper plate 50 to the lower plate 44. This must be done without losing dimensional freedom provided in the invention by avoiding coupling of the upper plate element 50 to the driver bar 16 by driver pins 22, and in a manner which maintains the rigid connection despite thermally related dimensional changes in the upper plate 50.

The present device accordingly employs a pin 58 which is designed and located to accomplish these purposes.

Initially, and with reference particularly to FIGS. 2, 3 and 6, the upper plate element 50 is provided with a major central aperture 60 located on the plate element axis and inwardly tapered from the outer surface 42 of the plate and toward the lower plate element 44. Correspondingly, the lower plate element 44 is provided with a like aperture 62, generally axial of the lower plate and coaxial with the upper plate aperture 60 and oppositely tapered inward from (the outer (bottom) surface 64 of the lower plate element. The thermal barrier 46 is also apertured at 66 coaxially with apertures 60 and 62.

The pin 58, as best shown in FIG. 6, comprises a cylindrical post 68 which may be chamfered at 70, an upper, separable wedge-shaped collar 72 radially split at 74 for purposes to appear, and a lower, integral wedge-shaped collar 76. The taper on collars 72, 76 are congruent with and interfit the conically configured, oppositely tapered apertures 60, 62.

Lower collar 76 is tapped at 78 to receive bolts 80 passing through bolt holes 82 in upper collar 72 whereby the collars are drawn tightly together against opposing walls of tapered apertures 60, 62, clamping the upper and lower plate elements 50, 44 together.

Lower collar 76 is provided with an annular recess 84 to receive O-ring 86 to seal lower aperture 62 against incursions of oil from oil film 28.

As will be described, the pin 58 transmits vibrations from the lower plate 50 and thus to test piece 26. To do this effectively, the bolts 80 are drawn down to fully engage the collars 72, 76 in their receiving recesses, apertures 60, 62. The kerf or split 74 in upper collar 72 is closed or nearly closed by the wedging of upper collar 72 into aperture 60. The upper collar 72 is thus dynamically tensioned in aperture 62.

Further provided is a series of fasteners 90 areally distributed across the length and breadth of the slip plate 20 (see FIG. 2) with the purpose of restricting or blocking curling of the upper plate element 50 away from the lower plate at portions thereof outward from the pin 58, such as may occur during different dimensional responses of the upper plate through thermal cycle temperature extreme exposure, relative to the lower plate element 44. As best shown in FIGS. 3, 5 and 7, fasteners 90 are bolts inserted through holes 92 in lower plate 44 and screwed into bushings 94 which in turn are screwed into tapered bores 96 in upper plate 50. Annular metal spaces 98 surround the bolts 90 to ease pressure on thermal barrier 46.

In operation, the slip plate 20 enshrouded in closed environment 40 and carrying test piece 26 is vibrated at an intended frequency, e.g. 2000 to 5000 cycles per second or higher or lower, with the vibrational energy passing from the lower plate element 44 to the upper plate element 50 and thus test piece 26 bolted thereto, through pin 58.

Vibration transmission is initially "efficient" i.e. the "g" forces on the upper plate element 50 are identical to the intended "g" forces put out by the shaker head onto the lower plate by virtue of the rigid coupling of the plate elements together by the pin 58 and specifically by collars 72, 74 on post 68. As the temperature in closed environment 40 declines, e.g. to $-50°$ F, the shrinkage of the plate 50, which is the only plate element so exposed it will be recalled, further tightens the aperture 60 about collar 72, which binds at both the post 68 and the aperture 60.

Expansion of the plate element 50 does not destroy the rigid interconnection the pin 58 affords as the wedging force of bots 80, the split ring dynamic force of the collar 72, and the comparable expansion of the post and collar metals all combine to maintain an effective vibration transmitting relation among lower plate 44, the pins 58 and upper plate 50.

Additionally, the bolt fasteners 90 are free to twist and bend as necessary in the tapped bores 96 (cf. 90a in FIG. 5), whereby plate element 50 movement parallel to plate element 44 is permitted as metal expansion and contraction requires by nonparallel movement, i.e. any vertical separation is blocked.

I claim:

1. A slip plate assembly for shaker-head generated vibration testing of a test piece being exposed to thermal cycling between preselected test temperature extremes in a closed environment, said assembly comprising: spaced, generally parallel and congruent plate elements including a first plate element beyond said closed environment for coupling of the assembly to said shaker head, and a test piece-carrying, test temperature dimensionally-responsive second plate element adapted to be exposed in said closed environment; and pin means defining a singular locus of vibration transmitting connection of said first plate element to said second plate element in dimensionally temperature responsive relation.

2. Slip plate assembly according to claim 1 in which said plate elements are each generally rectangular and said first plate element further includes a skirt portion for coupling to a shaker head-carried driver bar.

3. Slip plate assembly according to claim 1 in which said plate elements comprise lightweight metal.

4. Slip plate assembly according to claim 1 in which said plate elements are coaxially centrally apertured to receive said pin means.

5. Slip plate assembly according to claim 1 including also thermal insulation means thermally isolating said first plate element from said second plate element exposure to test temperature extremes.

6. Slip plate assembly according to claim 1 in which said pin means comprises a vibration transmitting post and first and second post collars adapted to respectively engage the outer surfaces of said first and second plate elements in plate element connection-effecting relation.

7. Slip plate assembly according to claim 6 including also plural fasteners in circularly distributed relation about said post urging said first and second collars uniformly toward each other and into engagement respectively with the first and second plate elements therebetween.

8. Slip plate assembly according to claim 7 in which said first plate element has a post-receiving central aperture therein at said locus of vibration-transmitting connection, said aperture being tapered toward said second plate element, and said first collar being congruently tapered to closely interfit with said aperture in its engaged relation with said first plate element.

9. Slip plate assembly according to claim 8 in which said second plate element has a tapered post-receiving central aperture therein coaxial with said first plate central aperture, said aperture being tapered toward said first plate element, said second collar being congruently tapered to closely interfit with said second plate aperture and radially split to bind on said post responsive to progressive interfittment of said second collar into said tapered second plate aperture, thereby maintaining vibration transmission through temperature-induced dimensional variations in said second collar and said second plate element.

10. Slip plate assembly according to claim 9 including also thermal insulating means thermally isolating said first plate element from said second plate element, said insulating means comprising a normally solid nonmetallic material less heat conductive than either plate element.

11. Slip plate assembly according to claim 10 in which said thermal insulating means comprises a synthetic organic polymer.

12. Slip plate asembly according to claim 11 in which said insulating means comprises a thermoplastic material foam.

13. Slip plate assembly according to claim 10 including also means blocking relative separating movement of said first and second plate elements beyond said post and collar arrangement.

14. Slip plate assembly according to claim 13 in which said separation blocking means comprises plural, areally distributed fasteners selectively blocking relative separating movement of said plate elements in second plate element thermal expansion and contraction accommodating relation.

15. A slip plate assembly for shaker head generated vibration testing of a test piece being exposed to thermal cycling between preselected test temperature extremes in a closed environment, said assembly comprising: spaced lightweight metal plate elements, including a first, generally rectangular plate element having a skirt portion on one side for coupling to a shaker head-carried driver bar and an axis-centered aperture formed therein tapering inward from the outer surface of said first plate element, and a second plate element rectangularly congruent with the non-skirt portion of said first plate element and having an axis-centered aperture formed therein tapering inward from the outer surface of said second plate element and coaxial with the first plate element aperture, said second plate element defining means for carrying said test piece in said closed environment for testing; a thermally insulative plastic foam sheet between said first and second plate elements maintaining said elements in spaced parallel planes; vibration transmitting pin means including a cylindrical post close fitting within said respective plate element apertures and wedge-shaped first and second post collars coaxial with said post and circularly engaged with the respective tapered portions of the apertures of said first and second plate elements; and collar fastening bolts parallel to said post, said bolts acting to secure the plate elements with the thermal insulation sheet therebetween together in vibration transmitting relation between said plate elements; said second plate element having dimensional response to test temperature conditions within said closed environment, said second post collar being radially split for circular expansion and contraction relatively to said second plate element expansion and contraction to maintain continuous vibration transmitting contact between the second post collar, the post and the second plate element throughout said thermal cycling; and peripheral fasteners limiting any relative movement of said first and second plate elements to movement in parallel planes.

* * * * *